E. P. BULLARD, Jr.
TOOL SLIDE FOR MACHINE TOOLS.
APPLICATION FILED MAY 7, 1919.
1,382,339.
Patented June 21, 1921.
4 SHEETS—SHEET 2.
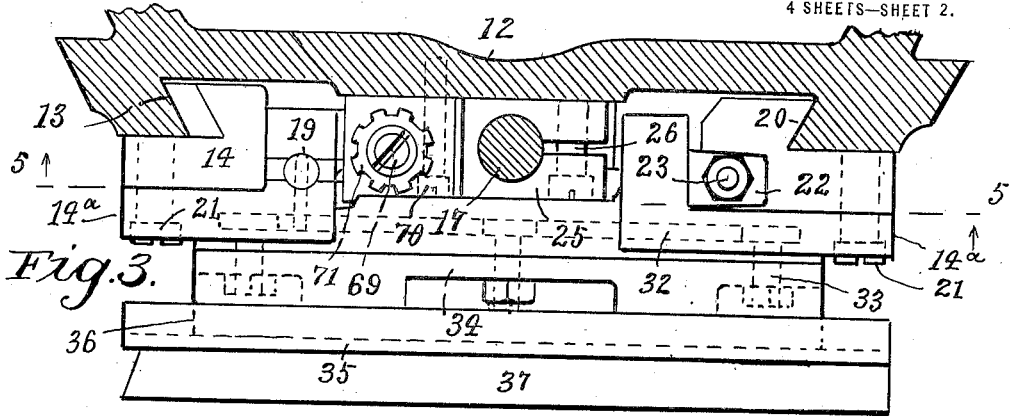
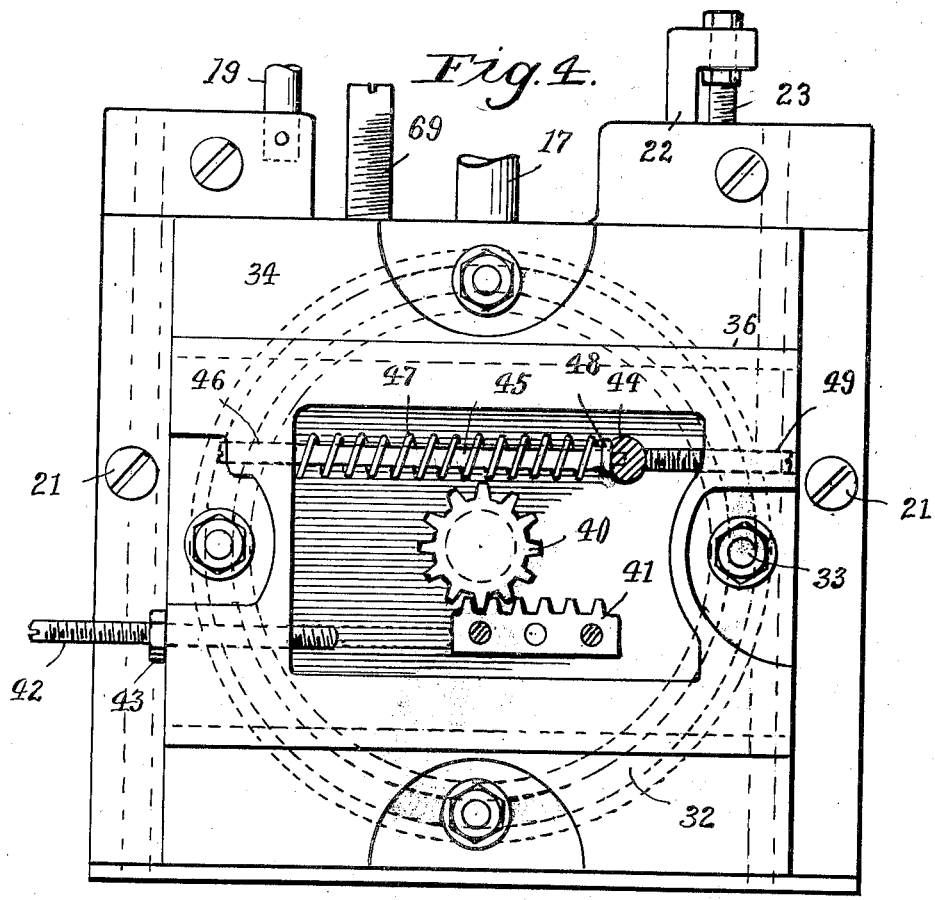
Inventor
Edward P. Bullard Jr.
By Chamberlain & Newman
Attorneys

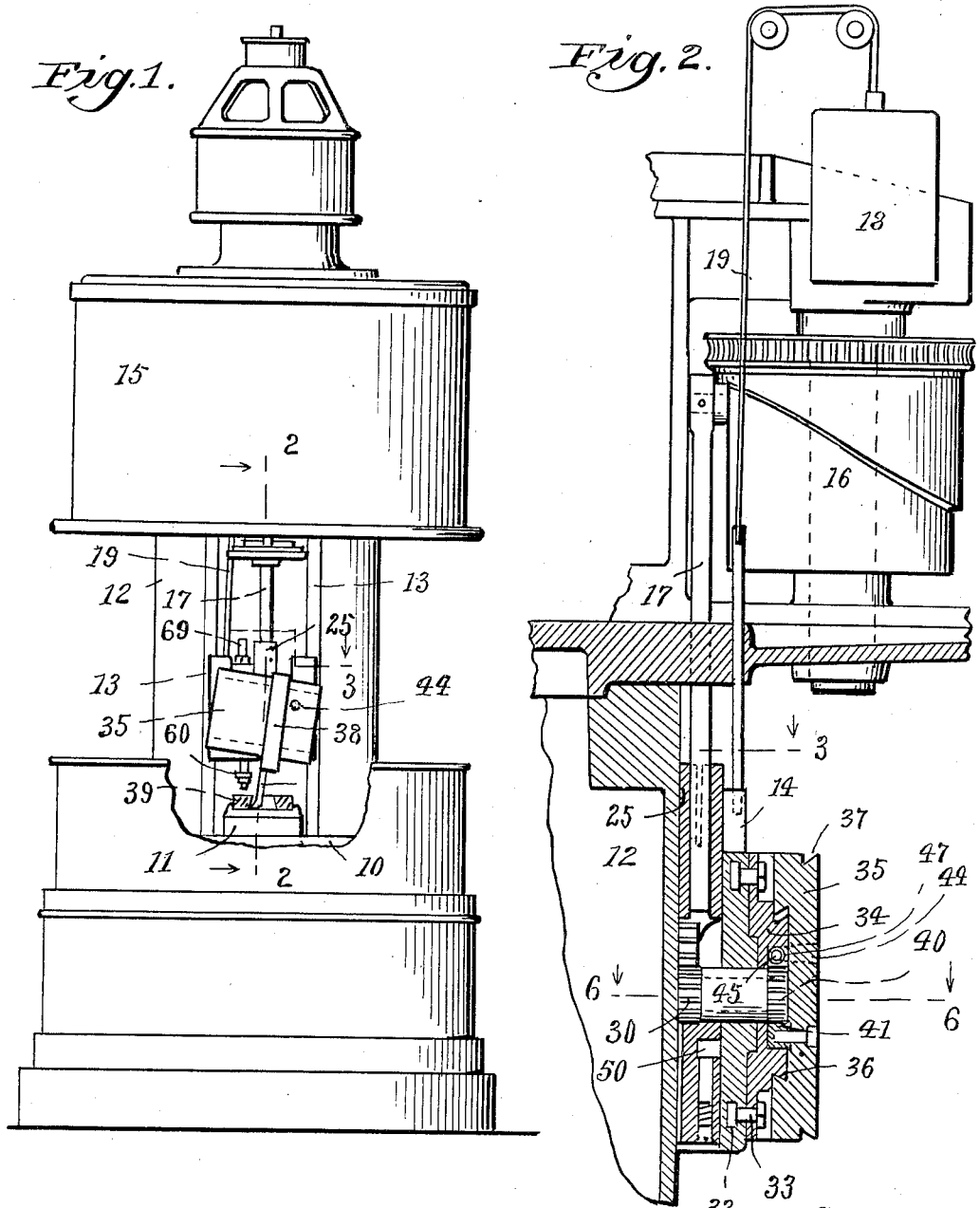

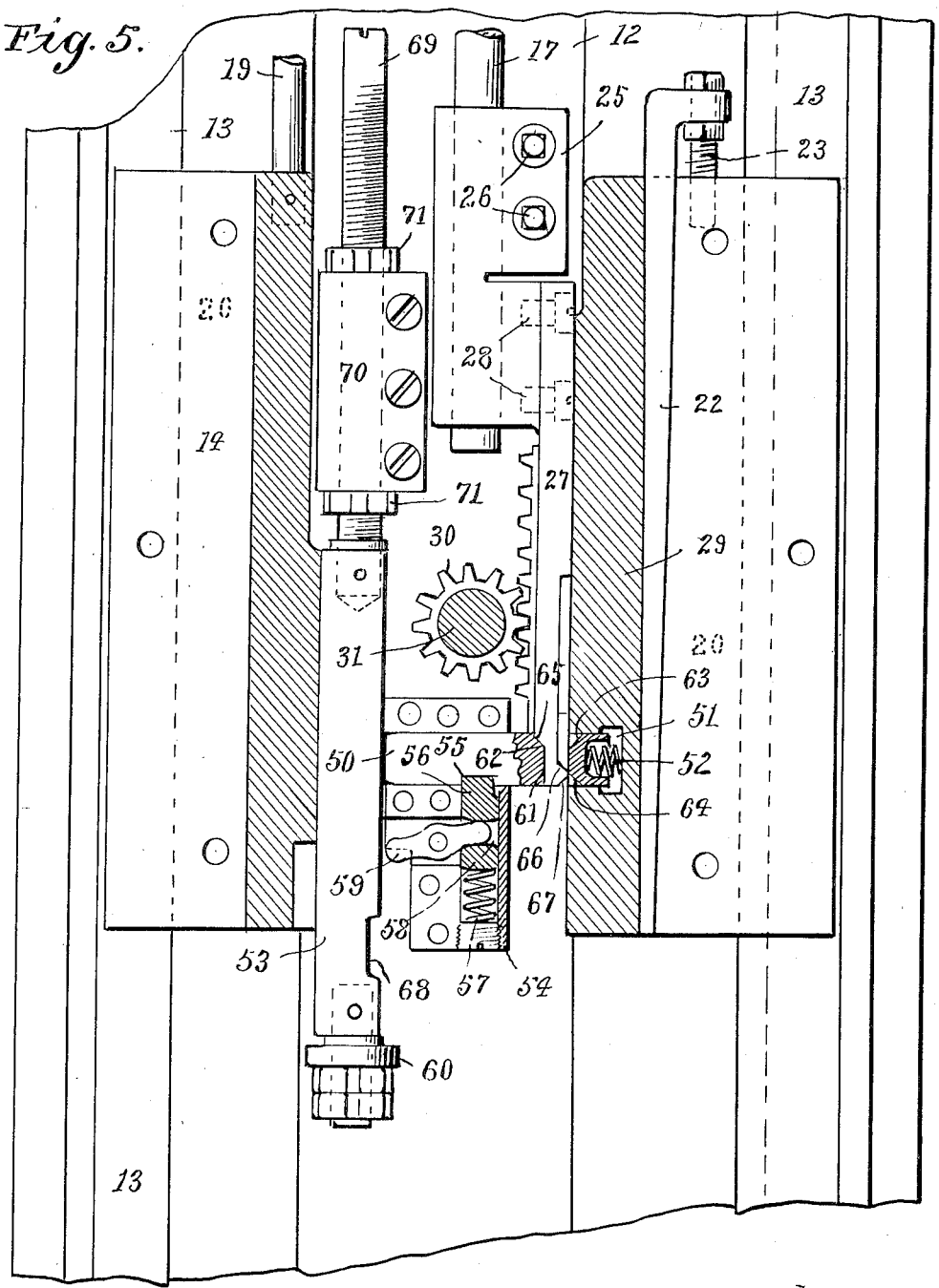

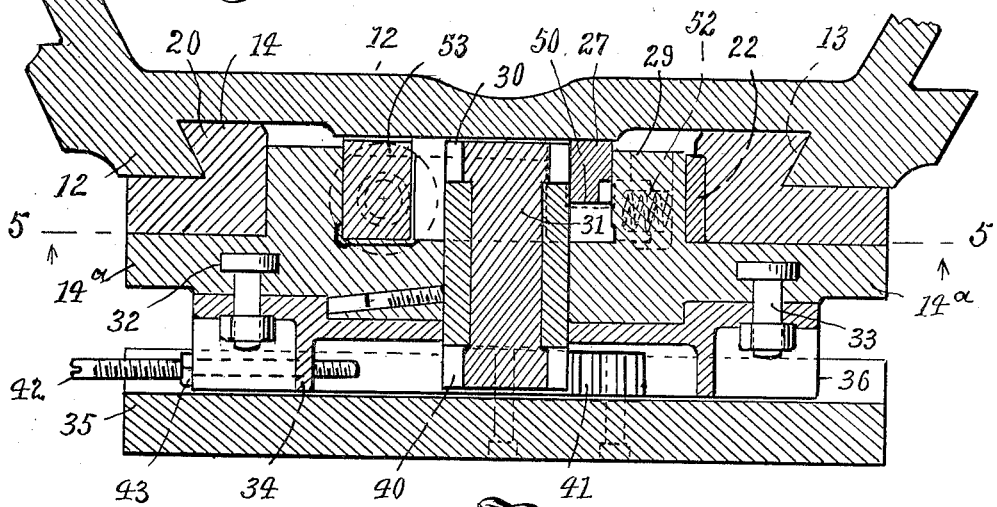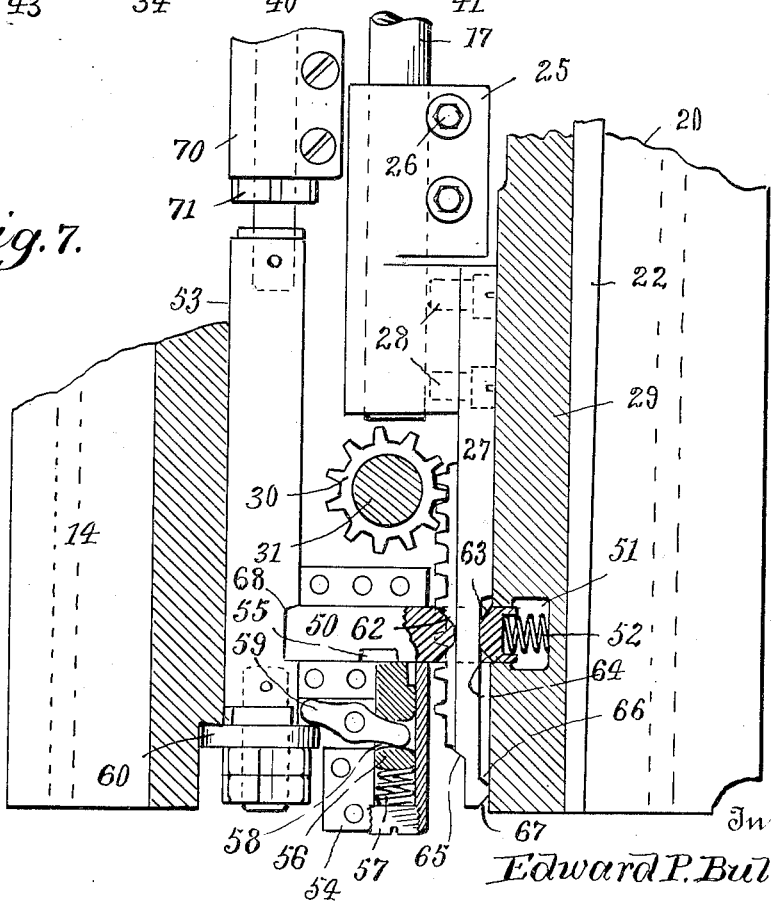

UNITED STATES PATENT OFFICE.

EDWARD P. BULLARD, JR., OF BRIDGEPORT, CONNECTICUT, ASSIGNOR TO THE BULLARD MACHINE TOOL COMPANY, OF BRIDGEPORT, CONNECTICUT, A CORPORATION OF CONNECTICUT.

TOOL-SLIDE FOR MACHINE-TOOLS.

1,382,339.  Specification of Letters Patent.  Patented June 21, 1921.

Application filed May 7, 1919. Serial No. 295,325.

*To all whom it may concern:*

Be it known that I, EDWARD P. BULLARD, Jr., a citizen of the United States, and resident of Bridgeport, in the county of Fairfield and State of Connecticut, have invented certain new and useful Improvements in Tool-Slides for Machine-Tools, of which the following is a specification.

This invention relates to new and useful improvements in tool slides for machine tools and particularly to that class of machine tool which includes one or more rotary work tables and one or more tool heads that operate to and from the work tables.

The objects of the invention include provisions for feeding the cutting tools vertically, horizontally and at various angles so as to perform vertical, horizontal and angular cutting, upon the work carried by the tables; the provision of means for automatically changing from a vertical to a horizontal feed in either direction, or to an angular feeding movement, whereby combined vertical and horizontal or angular cutting may be produced; the provision of the device of a saddle, bearing a swivel, a slide and connecting parts which may be adjusted to any angle or turned completely around upon the saddle and automatically fed sidewise in either direction or at any intermediate angle, with the swivel parts of the slide so arranged and designed that the above operations may be automatically performed by the vertical movement of the saddle actuating member and without any additional means of assistance.

Further to provide adjusting means whereby the slide may be set to determine its relative movements and so that the amount of the vertical movement may be either lengthened or shortened and the amount of the horizontal movements correspondingly decreased or increased, as the particular class of work may require, and finally to construct the device in a practical, efficient and durable manner, so as to insure uniform and accurate work of all pieces of a similar design and character.

With these objects in view and others as will hereinafter appear, the invention consists in certain novel and peculiar features of construction and organization as hereinafter described and claimed; and in order that it may be fully understood reference is to be had to the accompanying drawings forming a part of this specification upon which similar characters of reference are used to denote like or corresponding parts throughout the several figures and upon which:

Figure 1 shows a front elevation of a multiple spindle machine tool of the "Mult-Au-Matic" type, showing my improved form of adjustable tool slide applied thereto.

Fig. 2 is an enlarged vertical sectional view of a portion of the upper part of the machine shown in Fig. 1 including a central vertical section of the tool slide, taken on line 2—2 of Fig. 1.

Fig. 3 shows a further enlarged top and sectional view of the tool slide, as seen from line 3 of Figs. 1 and 2.

Fig. 4 illustrates a front view of a portion of the slide including the saddle and swivel plate upon which the front slide is mounted.

Fig. 5 shows a front elevation of the machine column including its ways, upon which the saddle is mounted and also shows parts of the saddle in sectional elevation, the section being taken on line 5—5 of Figs. 3 and 6.

Fig. 6 is a central horizontal cross section, looking down and taken on line 6—6 of Fig. 2; and Fig. 7 shows a sectional elevation, somewhat similar to Fig. 5, but with the saddle in a lowered and locked position.

My invention has been designed for use upon my improved form of "Mult-Au-Matic machine" shown in outline in Fig. 1, and more completely illustrated in my pending application Serial No. 198,404, but I wish it understood that its usefulness is not in any way limited to that particular type of machine.

This machine is a multiple spindle machine, including a rotary carrier 10 in which is mounted a series of rotary work tables 11. Upon the column 12 of the machine are provided vertical ways 13 to accommodate the saddles 14 of the slide. In the upper casing 15 is contained a series of feed works, one for each slide, which serve to operate the slides in feeding the tools to and from the work carried upon the table.

The particular construction of the slide is not in any way dependent upon this particular form of feed works, neither is the use of the feed work limited to my present form of slide. The tool slide may therefore be readily adapted for use in connection with any form of automatic machine tool wherein it is desirable to provide both vertical and horizontal or angular feeding movements for the cutting tools.

Referring further to the construction of that much of the Mult-Au-Matic machine shown in the drawings, it will be seen that the feed work includes in part a cam 16 which is operated to impart a vertical reciprocatory movement to the rod 17 and saddle. The weight 18 is connected by a line 19 with the slide to counterbalance the weight of the same and to hold the roll carried by the rod in engagement with the cam.

As shown the saddle 14 is provided with suitable ways 20 that are fitted between the correspondingly shaped vertical ways 13 of the column so that the saddle together with its attached parts may be moved vertically to feed the cutting tools, to and from the work when carried upon the table. This saddle as shown is formed of two main parts, the inner member 14 and the front plate 14ᵃ which is secured to the member 14 by means of screws 21, and the gib 22 which is positioned between the two parts and held by means of the adjusting screw 23.

The rod 17 through which the slide is operated by the cam is operatively connected to this saddle so as to produce the vertical, horizontal and angular movements of the cutting tools 24, and as will be seen includes a bracket 25 having a hole therethrough to receive the rod and provided with clamping screws 26 for securing the rod to the bracket. This bracket is fastened to a rack 27 by means of screws 28, and the rack in turn is of special construction and designed to be reciprocated longitudinally between the face of the column, a rib 29 of the saddle, and the pinion 30 mounted upon the central shaft 31.

The front plate 14ᵃ of the saddle 14 is provided with an annular shouldered groove 32 in which the heads of clamping screws 33 are mounted. These clamping screws are further mounted in holes of the swivel plate 34 and are provided with nuts whereby the swivel plate 34 is clamped to the saddle in any desired position. This swivel plate and its slide 35 carried thereon are thus adapted to be turned partially or completely around on the saddle so as to operate the front slide 35 in either sidewise or angular directions to perform various forms of cuts on the work carried upon the tables. The front slide 35 is mounted upon the ways 36 (see Figs. 2 and 4) of the saddle to permit the slide to move crosswise. The front slide is also provided with suitable ways 37 to adjustably support the tool holder 38, which may be of any approved design, and operates upon the work carried upon the table as for instance in the manner indicated in Fig. 1 where an inner annular inclined wall of a piece of stock 39 is being finished.

The crosswise movements of the front slide are effected by any movement of the rack 27 relative to the saddle, and through the connection of the pinion 30, shaft 31, pinion 40, and the rack 41 secured in the front slide shown in Figs. 2 and 4. Shaft 31 is mounted in the saddle and is carried therewith and is adapted to be rotated by rack 27 when the same is not held. After the saddle and swivel have been carried down a predetermined distance as may be required to give the length of stroke required for the vertical cuts, the rack 27 is released, as will later be explained to turn the pinions and shaft 31 to operate the rack 41 on the front slide in a way to move the same crosswise.

I further provide a screw 42 which is threadably mounted in the swivel plate and adapted to be positioned in against the rack 41 as indicated in dotted lines in Fig. 4, when desired to hold the front slide against crosswise movement as for instance when vertical cuts only are to be made. This screw is arranged to be run back as shown in full lines when the said front slide is to be operated crosswise, and a lock nut 43 serves to hold the screw in its adjusted positions.

As before stated the swivel connection of the swivel plate to the saddle permits the swivel plate to be turned partially or completely around upon the face of the saddle so as to operate the front slide either to the right or left or at intermediate angle. I have therefore further provided a holding device to support and hold the front slide up and against its pinion 40 so as to better insure accurate work. This device will probably best be understood with reference to Figs. 1, 2 and 4 wherein it will be seen that I have mounted a pin 44 in the front slide, which extends back in the central pocket of the swivel and in position to be engaged by the end of the slide rod 45 which is slidably mounted at 46 in the end portion of the swivel plate. Upon this rod is mounted a spring 47 that is positioned between the inner wall of the swivel plate and a collar 48 mounted upon the end of the rod. An adjustable stop screw 49 is arranged in the opposite end portion of the swivel plate, in alinement with the pin 44 so as to engage the same to form a stop against which the pin is normally held by the action of the spring 47. It will thus be seen that any movement of the front slide to the left as shown in Figs. 1, 3 and 4 through the action of the pinion and rack 41, are necessarily performed against the resistance of the spring 47 which latter is compressed during said forward feeding movements. This spring again becomes extended back to the position shown in Fig. 4, as the front slide assumes its central or normal position preparatory to the return upward movement of the said slide, swivel and saddle.

The means for locking the rack 27 within the saddle, so as to insure a vertical movement of the same, comprises in part a locking pin 50 that is engaged by the rack, and other means for automatically operating the same at predetermined times. This locking pin is mounted in part, in a pocket 51 of the saddle, and in which is also provided a spring 52 that acts upon the pin to force the same outward. The other end portion of the locking pin is operatively mounted in a bracket 54 which is secured to the inner face of the saddle plate 14ᴬ and is provided with a notch 55 in its side portion to be engaged by the detent 56 that is slidably mounted in a vertical pocket of the lower part of the same bracket 54. This detent is yieldably held in engagement with the pin by means of a spring 57 and is provided with a pocket 58 into which one end of a trip lever 59 extends and whereby the detent is disengaged from the locking pin to free the same when the said lever engages the stop 60 upon the adjustable stop bar 53.

The locking pin is further provided with a vertical hole 61 therethrough having specially shaped side walls which include an incline 62 upon one side and inclines 63 and 64 upon the other. These inclines are engaged at certain times by the corresponding inclines 65, 66 and 67 upon the rack 27 so as to more positively control the positions and operation of the locking pin. In this connection it will be seen that during the feeding operations the tendency of the rack 27 is to bear upon the pin so long as the pin is locked by the detent. The rack and pinions are therefore held against independent movement and become fixed so as to be locked to the saddle. This condition insures the vertical movement of the saddle, swivel, slide, etc. downward until the free end of the lever 59 engages the stop 60 which action causes the withdrawal of the detent and allows the locking pin to be shoved over by the action of its spring and the rack, into the pocket 68 of the stop bar as shown in Fig. 7. This releasement of the lock pin now permits the rack to be fed down with respect to the saddle in a way to rotate the pinion and its shaft thereby causing the pinion upon the other end of the shaft to move the rack and front slide and to feed the same to the right or left according to whether or not the front plate is set in its normal position as indicated in the drawings, or whether the swivel has been rotated and inverted with the positioning of the rack above the pinion.

The stop bar is adjustably mounted on the column and is adapted to be raised and lowered to position its pocket 68 at various heights from the work table and so as to stop the down feed at any desired point and to throw in the cross feed. This stop bar is suspended upon an adjustable screw 69 that is threadably mounted in a bearing 70 secured to the face of the column. Nuts 71 are mounted upon the screw 69 and against the bearing so the screw may be positively locked after it has been adjusted to the position required. From this construction it will be understood that the lower the position of the stop bar the longer will be the down feed and the shorter the cross feed which is thrown in just as soon as the down movement of the stop pin reaches the pocket 68 and releases the rack to operate the pin 50.

The return movement of the tool slide is just the reverse of the forward movement and when both the vertical and cross feed are used the return movement of the cross slide precedes the upward movement. It will be understood that either one feed or the other may be used and that the two do not necessarily have to be used together.

Having thus described my invention, what I claim and desire to secure by Letters Patent, is—

1. The combination with a movable saddle and a cross slide mounted thereon, of a reciprocatory rod, a positive locking device between the rod and saddle whereby the slide and saddle can be fed forwardly, means for causing crosswise movement of the slide, and means for releasing the locking device from the saddle to allow said before mentioned means to operate.

2. The combination of a movable saddle, a swivel plate mounted to be turned around thereon, a tool carrying member slidably mounted on the swivel plate, a reciprocatory rod secured to the saddle and adapted to move the saddle and slide forwardly, means whereby the tool carrying member can be given crosswise movement, and a trip device for releasing the rod from the saddle to allow said means to operate.

3. The combination with a movable saddle and a cross slide mounted thereon, of a reciprocatory rod, means connecting the rod and saddle whereby the saddle and slide are fed forwardly, an automatic trip device for releasing the saddle from the rod, and means operative between the slide and rod whereby the slide can be fed crosswise after the trip device has released the saddle from the rod.

4. The combination with a movable saddle and a cross slide mounted thereon, of a reciprocatory rod, means connecting the rod and saddle whereby the saddle and slide are fed forwardly, said connecting means including a rack carried by the rod, means for releasing the rod from the saddle, and a pinion carried by the slide and adapted to be engaged by the rack, whereby the slide can be fed crosswise after the releasing means has been actuated.

5. The combination with a movable saddle and a cross slide mounted thereon, of a reciprocatory rod, means connecting the rod and saddle whereby the saddle and slide are fed forwardly, an automatic trip device for releasing the saddle from the rod, means operative between the slide and rod whereby the slide can be fed crosswise after the trip device has released the saddle from the rod, and adjustable means for changing the relative amount of each of said feeding movements.

6. The combination with a movable saddle and a cross slide mounted thereon, of a reciprocatory rod, means connecting the rod and saddle whereby the saddle and slide can be fed forwardly by forward movement of the rod, automatic means for releasing the saddle from the rod, and means operative between the slide and rod whereby the slide can be fed crosswise by further forward movement of the rod after the releasing means has been actuated.

7. The combination with a movable saddle and a cross slide mounted thereon, of a reciprocatory rod, means connecting the rod and saddle whereby the saddle and slide can be fed forwardly by forward movement of the rod, said connecting means including a rack carried by the rod, automatic means for releasing the saddle from the rod, and a pinion carried by the slide and adapted to be engaged by the rack, whereby the slide can be fed crosswise by further forward movement of the rod after the releasing means has been actuated.

8. A tool slide for machine tools comprising a slidable saddle, a rotatably adjustable swivel plate mounted thereon, a tool carrying member slidably mounted on the swivel plate, means for feeding the saddle forward and backward, and means whereby the tool carrying member is first returned to a central position before the swivel and saddle are returned.

9. In a tool slide the combination of a saddle mounted to move upon ways, a rotatably adjustable swivel mounted thereon, a shaft having a pinion mounted upon each end, a tool carrying member mounted to slide upon the swivel and connected with one of the pinions to be operated thereby, and a member slidably mounted in the saddle and engaging the inner pinion and saddle in a manner to move the latter forward to feed the tools.

10. In a tool slide the combination of a longitudinally movable saddle, a shaft mounted in the saddle and bearing a pinion, a slidable rack mounted in the saddle and engaging the pinion, a locking device which prevents the rack from operating the pinion for a predetermined period, means for automatically releasing said locking device so that the rack may slide within the saddle to turn the pinion and shaft, and a tool carrying member slidably mounted on the swivel and connected to be operated through the shaft and pinion.

11. In a tool slide the combination of a longitudinally movable saddle, a shaft mounted in the saddle and bearing a pinion, a cross slide, a slidable rack mounted in the saddle and engaging the pinion, a locking device to prevent the rack from operating the pinion for a predetermined time, a stop to trip and release the locking device so that the cross movement of the tool carrying member may be effected at any prearranged time.

12. In a tool slide the combination of a longitudinally movable saddle, a shaft mounted in the saddle and bearing a pinion, a cross slide, a slidable rack to engage the pinion, a device for locking the rack to the saddle to operate the same for a predetermined distance, means to release the locking device and to free the rack to operate the pinion, shaft and front slide at any prearranged time.

13. The combination of a saddle, a rotatably adjustable swivel mounted thereon, a shaft mounted in the saddle and swivel, a pinion upon each end of the shaft, a tool slide mounted to slide upon the swivel and having a rack connected with one of the pinions, a member engaging the saddle to move the same forward, and a trip device for releasing the saddle from said member to allow the member to become operatively connected with one of the pinions to give to the tool slide crosswise movement.

14. The combination of a saddle, a swivel mounted to turn around thereon and having cross ways, a slide mounted upon the ways of the swivel, a member in engagement with the saddle to move the same forward, a trip device for releasing the member from the saddle, and operative connections between the member and slide whereby the slide can be given crosswise movement after the member has been released from the saddle.

15. In a tool slide, the combination of a saddle, a swivel mounted to be turned around thereon and having cross ways, a slide mounted upon the cross ways of the swivel and having a rack, a shaft mounted in the saddle and swivel and bearing a pinion to engage the rack, a rack within the saddle for moving the saddle and cross slide forward, and a trip device for releasing the rack from the saddle to allow it to operate the shaft, pinion and rack to feed the cross slide.

16. In a tool slide the combination of a longitudinally movable saddle, a shaft mounted in the saddle and bearing a pinion, a cross slide, a slidable rack to engage the pinion, a pin for locking the rack to the saddle and to operate the same a predetermined distance, a device to hold the pin in said engagement, an adjustable stop bar secured to the saddle to release the locking pin and to free the rack to operate the pinion, shaft and front slide at any prearranged time.

17. In a tool slide the combination of a longitudinally movable saddle, a shaft mounted in the saddle and bearing a pinion, a cross slide connected thereto, a slidable rack to engage the pinion, means for locking the rack to the saddle to operate the same a predetermined distance, an adjustable means secured to the saddle to release the locking means and to free the rack to operate the pinion, shaft and front slide at any prearranged time.

18. The combination of a supporting means, an actuating member, a rack connected thereto, a pinion and shaft connected to the rack, a saddle carried by the rack, pinion and shaft, a cross slide carried by the saddle and connected with the shaft, means for securing the saddle to the rack to be moved thereby or for releasing the rack from the saddle in order that the rack can actuate the cross slide.

19. In a tool slide the combination of a rack, means for reciprocating the same, a saddle mounted to move upon ways, means for securing the saddle to the rack to be moved thereby or for releasing the rack from the saddle, a shaft mounted on the saddle having a pinion to engage the rack, and a tool carrying slide connected with the shaft to be operated by the rack when released from the saddle.

20. In a tool slide the combination of a shaft having a pinion upon each end, a slidable rack engaging one of said pinions, a saddle carried by the rack, means for operating the rack, a slide in engagement with the second pinion, a locking device which prevents the rack from operating the pinion for a predetermined period, and means for automatically releasing said locking device so that the rack may slide within the saddle to turn the pinion and shaft.

21. In a tool slide the combination of a swivel, a longitudinally movable saddle adjustably connected with the swivel, a shaft mounted in the saddle and bearing a pinion, a cross slide slidably mounted on the swivel, a slidable rack mounted in the saddle and engaging the pinion, means for causing the saddle to move with the rack for a predetermined time, and means whereby the rack can move independently of the saddle to rotate the pinion to operate the cross slide.

Signed at Bridgeport, in the county of Fairfield and State of Connecticut, this fifth day of May, A. D. 1919.

EDWARD P. BULLARD, Jr.

Witnesses:
John E. Cotter,
W. J. Lynch.